Sept. 22, 1942.   A. N. BLUM   2,296,241
PULPWOOD SAW FRAME
Filed March 7, 1940
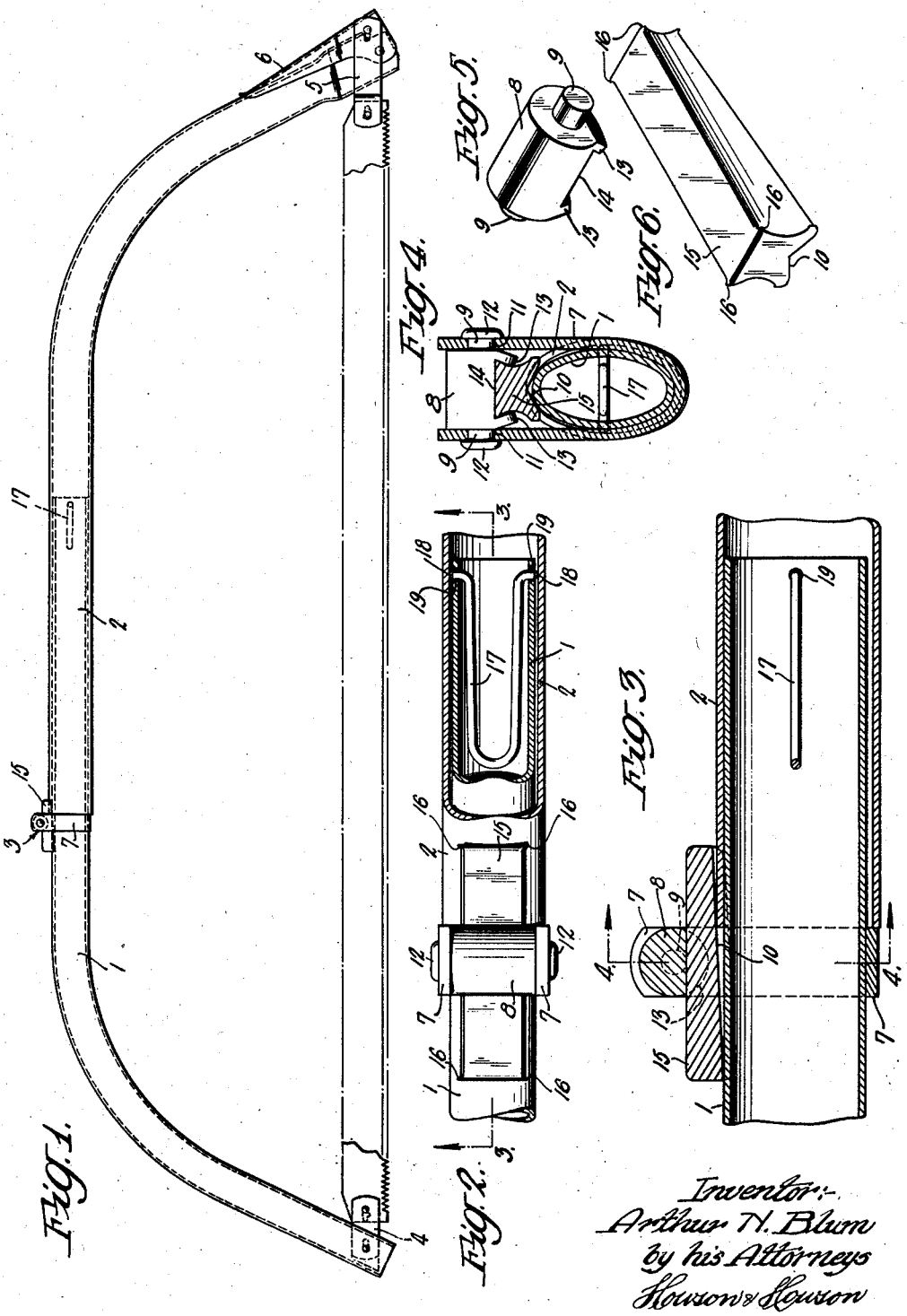

Patented Sept. 22, 1942

2,296,241

UNITED STATES PATENT OFFICE 2,296,241

PULPWOOD SAW FRAME

Arthur N. Blum, Philadelphia, Pa.

Application March 7, 1940, Serial No. 322,807

9 Claims. (Cl. 287—58)

This invention relates primarily to adjustable frames for pulpwood saws, and a principal object of the invention is to provide a generally improved, relatively simple and durable frame of this type.

More particularly, the invention has for an object the provision of an adjustable frame of the stated type which may be easily and conveniently adjusted for different lengths of saw blade.

Still more specifically, an object of the invention is to provide an improved locking device for the relatively adjustable parts of the frame, said device requiring no special tools for operation and assuring absolute permanency of adjustment.

Another object of the invention is to provide means for precluding loss of the aforesaid locking device from the frame.

The invention resides further in certain novel structural details hereinafter described and illustrated in the attached drawing, wherein:

Figure 1 is a side view of a frame made in accordance with the invention;

Fig. 2 is an enlarged fragmentary top and partial sectional view of the frame;

Fig. 3 is a section on the line 3—3, Fig. 2;

Fig. 4 is a transverse section on the line 4—4, Fig. 3; and

Figs. 5 and 6 are detached views in perspective of elements of the frame-locking device.

The saw frame illustrated in the drawing comprises two longitudinal relatively adjustable sections 1 and 2, each made in the present instance of steel tubing. The two sections telescope slidably one within the other, and to this end, the cross sectional dimensions of the section 1 are somewhat smaller than those of the section 2. The oval cross sectional form of the tubing prevents the turning of the one section with respect to the other. Adjustment of the effective length of the frame to suit the length of the saw blade is effected by sliding the one section within the other, and means is provided for rigidly locking the two sections together in adjusted position, the locking means being indicated generally by the reference numeral 3. The saw blade is supported on suitably formed link devices 4 and 5 which are attached to the opposite free ends respectively of the saw frame, and one of these devices 5 in the present instance is associated with a locking lever 6, by means of which a suitable tension may be imposed upon the blade.

The locking device 3 consists in the present instance of a U-shaped strap 7 which embraces the inner and side faces of the frame member 1, as best shown in Fig. 4, and which carries between its outer free ends a wedge-supporting member 8. The member 8, as shown in Figs. 4 and 5, is preferably cylindrical in shape and is formed with trunnions 9, 9 which are journaled in aligned openings 11 in the opposite sides of the strap 7, the outer ends of the trunnions being upset, as indicated at 12, so as to secure the block pivotally between the arms of the strap 7. The member 8 is recessed at one side, the said recess terminating short of the axial ends of the body portion of the member so as to form in the latter two flanges 13, 13 which may be bent inwardly to form a dovetail way 14 for reception of a correspondingly dovetail wedge element 15. This wedge element is best shown in Figs. 6 and 4, the latter figure illustrating the manner in which the element is supported in the dovetail way 14 of the member 8. The wedge element may be assembled with the member 8 by first inserting the said element in the recess between the two flanges 13, and subsequently bending the flanges inwardly as described against the inclined sides of the wedge element; or the flanges 13 may be bent inwardly to the relatively converging position prior to insertion of the wedge element therebetween. The wedge assembly comprising the member 8 and the wedge element 15 is designed for inexpensive manufacture, and in this respect it will be noted that the member 8 is adapted to be produced readily and cheaply on automatic screw machines.

By reason of the dovetail connection, the wedge 15 is slidably supported in the member 8, and preferably the ends of the wedge element are upset, as indicated at 16, so as to prevent complete displacement of the wedge from the carrier member. Preferably also the inner face of the wedge element is longitudinally recessed as indicated at 10, the function of this recess being hereinafter described. The arrangement described above permits the wedge to rock within the strap 7 about the axis of the trunnions 9, and provides also for sliding movement of the wedge longitudinally with respect to the supporting strap element.

In assembly, sufficient clearance is provided between the inner face of the wedge and the adjoining edge of the frame member 1 to permit the smaller end of the wedge to pass over the inner edge of the frame member 2, as shown in Fig. 3, and by subsequently driving the wedge forwardly over the edge portion of the frame member 2, the two relatively adjustable members of the frame may be anchored solidly in adjusted position. In this operation, the pivotal mounting of the wedge in the strap permits the wedge to take an angular position over the edge of the outer frame member 2, as shown in Fig. 3, without affecting the normal position of the strap 7 in flat engagement with the surface of the inner frame member 1, in which position the strap is best adapted to form a solid abutment for the proximate end of the outer frame member.

The driving of the wedge as described above has the double effect of clamping the strap 7 solidly and immovably upon the frame member 1, and of jamming and solidly anchoring the two frame members together. The strap 7 being rigidly clamped to the frame member 1 constitutes a solid abutment for the extremity of the member 2, and precludes any further telescoping movement of the two members. It will be noted that the recessed inner face of the wedge is in solid engagement with both of the frame members, and the inwardly converging sides of the recess 10 create a wedging action between the frame members and the wedge element which materially increases the friction between the frame members and the wedge element. It will be noted further that the tensioning of the blade in the frame, as previously set forth, acts to increase the pressure contact between the wedge and the frame member 2.

While the locking device 3 functions as described above to rigidly unite the frame members 1 and 2 in any position of relative adjustment, it will be apparent that the manipulation of the device to this end is an extremely simple one involving merely the driving of the wedge 15 into the locking position. Release of the locking device is correspondingly simple. It will be noted further that the elements of the locking device are, in effect, permanently secured together so that all danger of loss of any of the essential elements of this device is obviated.

In order to prevent possible loss of the locking device as a whole in the event that the two frame members 1 and 2 are entirely separated from each other, I provide means for preventing accidental displacement of the strap 7 and the associated elements of the locking device from the frame member 1 upon which it is slidably supported. This retaining means consists in the present instance of a U-shaped spring element 17, see Fig. 2, which is established in the interior of the frame member 1 and which has its free ends 18 offset laterally and projecting into apertures 19 in the opposite side walls of the said frame member. Normally the ends 18 will bear against the inner wall faces of the member 2, but when the member 1 is withdrawn from the member 2, these ends 18, by reason of the action of the spring 17, will be projected outwardly to form stops preventing displacement of the strap 7 from the frame member. The locking device 3 may be readily withdrawn from the end of the member 1, however, by pressing the ends 18 of the spring inwardly to an extent bringing the extremities within the contour of the outer wall surface of the said member.

I claim:

1. The combination with two telescopically-fitted relatively adjustable members, of a strap element embracing and adjustable longitudinally of the inner of said members, a rotary element extending transversely between the opposite sides of said strap, and a wedge slidably mounted in said rotary element for adjustment longitudinally of said members, said wedge adapted to be driven over the edge of the outer of said members to bind the members together.

2. The combination with two telescopically-fitted relatively adjustable members, of a strap element embracing and adjustable longitudinally of the inner of said members, a rotary element extending transversely between the opposite sides of said strap, and a wedge slidably mounted in said rotary element for adjustment longitudinally of said members, said wedge adapted to be driven over the edge of the outer of said members to bind the members together, and means for preventing displacement of said wedge from the rotary element.

3. The combination with telescopically-fitted relatively adjustable members, a clamping member longitudinally adjustable on an inner of said members and adapted to clamp said members together, and means for preventing displacement of said clamp from the ends of the said inner member, said last-named means comprising a spring-actuated element set into the end of said inner member and adapted in normal extended position to form a stop for said clamp.

4. The combination with two telescopically-fitted relatively adjustable members, of a strap element embracing and adjustable longitudinally of the inner of said members, a member rotatably supported between the opposite sides of the strap and having a recess in the side thereof terminating short of the axial ends of said member so as to leave at each end of the latter an integral flange defining the ends of the recess, said flanges being turned inwardly and converging toward the mid portion of the member, and a wedge element interlockingly engaged with and supported by said flanges for longitudinal sliding movement within the said recess, said wedge adapted to be driven over the edge of the outer of said members and when so driven to exert pressure to bind said members together and to rigidly secure the strap element to said inner member.

5. The combination with two telescopically-fitted relatively adjustable members, of a strap element embracing and adjustable longitudinally of the inner of said members, a member rotatably supported between the opposite sides of the strap and having a recess in the side thereof terminating short of the axial ends of said member so as to leave at each end of the latter an integral flange defining the ends of the recess, said flanges being turned inwardly and converging toward the mid portion of the member and forming with said recess a dovetail way, and a correspondingly dovetailed wedge element slidably supported in said way, said wedge adapted to be driven over the edge of the outer of said members and when so driven to exert pressure to bind said members together and to rigidly secure the strap element to said inner member.

6. The combination with two telescopically-fitted relatively adjustable members, of a clamp element embracing the inner of said members and adjustable longitudinally of the latter, and a wedge pivotally supported in said clamp element and adapted when forced over the edge of the outer of said members to bind said members together and to rigidly secure the said clamp element to the said inner member, the face of said wedge element being provided with a longitudinal recess having inwardly converging sides for frictional wedging engagement with the surfaces of said members.

7. The combination with two telescopically fitted relatively adjustable members, of a clamp element embracing the inner of said members and adjustable longitudinally of the latter, a wedge carried by said clamp element and longitudinally adjustable therein over the outer of said members to thereby exert wedging action between the said member and the clamp element binding the latter on the inner member, said wedge being pivotally supported in the clamp element so as to permit self-adjustment of the wedge when driven over the edge of said outer member into a relatively inclined position bearing against and exerting simultaneous gripping pressure upon both of said members.

8. The combination with two telescopically fitted relatively adjustable members, of a strap element embracing and adjustable longitudinally of the inner of said members, an element extending transversely between the opposite sides of said strap, and a wedge supported in said element for both pivotal and longitudinal movement between the said strap ends, said longitudinal movement providing for driving the wedge over the outer of said members to thereby exert wedging action between the said member and the strap binding the latter on the inner member, and said pivotal movement permitting self-adjustment of the wedge when driven over the edge of said outer member into a relatively inclined position bearing against and exerting simultaneous gripping pressure upon both of said members.

9. The combination with telescopically fitted relatively adjustable members, of a clamp longitudinally adjustable and normally freely slidable on the inner of said telescoping members and adapted to clamp said members together in adjusted position, and stop means on the telescoped end of said inner member for preventing displacement of the clamp from the said end of the inner member when the latter is withdrawn from the outer member, said stop means comprising a substantially U-shaped spring element having its free ends offset laterally and projecting into apertures in the opposite side walls of the inner member, said ends being retractable into the inner member so as to permit the insertion of the inner member into the outer member and being adapted to project outwardly through said apertures and beyond said side walls into the path of the clamp when the members are separated to prevent the said displacement of said clamp.

ARTHUR N. BLUM.